Dec. 12, 1967 K. H. GREIFENHAGEN 3,357,652

COUPLING DEVICE

Filed Aug. 23, 1965

Inventor:

Karl Heinz Greifenhagen

United States Patent Office 3,357,652

Patented Dec. 12, 1967

3,357,652

COUPLING DEVICE

Karl Heinz Greifenhagen, Kronach, Upper Franconia, Germany, assignor to Loewe Opta G.m.b.H., Berlin, Germany, a company of Germany Filed Aug. 23, 1965, Ser. No. 483,904

Claims priority, application Germany, Aug. 28, 1964, L 37,833

2 Claims. (Cl. 242—68.3)

Figures 1, 2, 3:
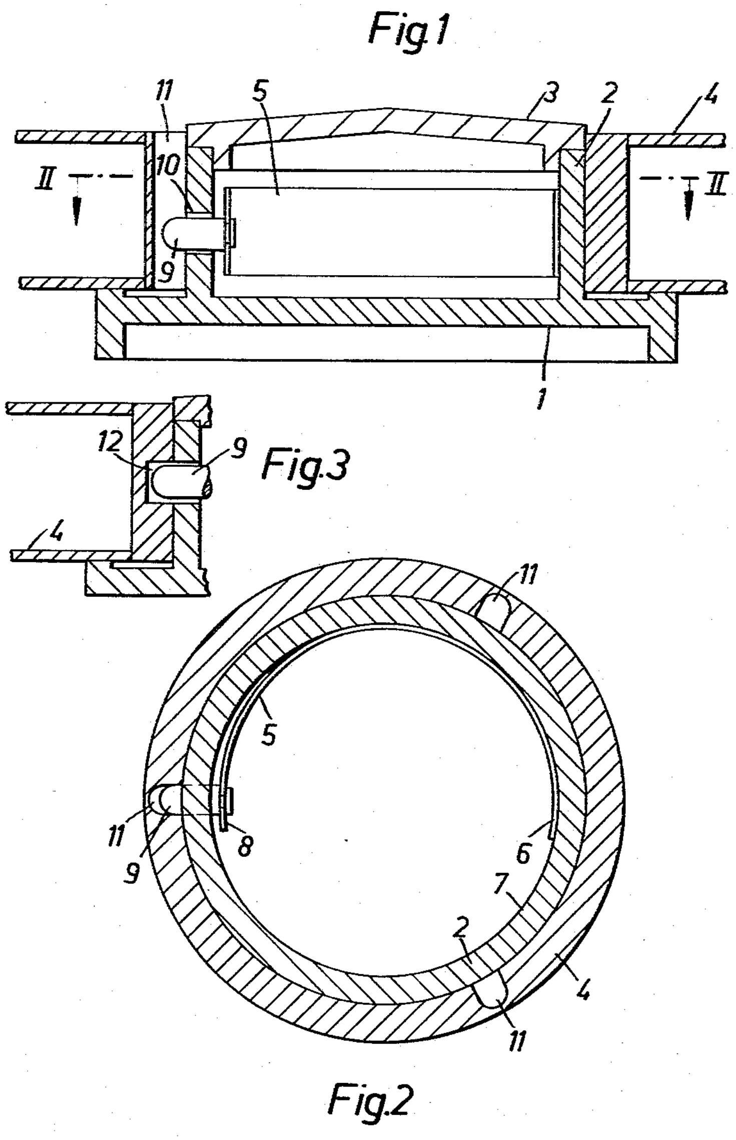

Windable film bands and magnetic tape recording media are usually wound on flanged reels. In recording or reproducing the film or tape runs from a feeding reel past the optical and/or electrical recordng or reproducing elements and—in the case of unperforated tape—between a drive roller rotating at constant speed and a sprung pressure roller on to a take-up reel. Each tape reel rotates on the arbor of a turntable of the recording/reproducing apparatus. The drive between turntable and tape reel in such apparatus is supplied e.g. by an axial turntable arbor with three radial wings at 120° to each other; these wings engage in appropriately shaped recesses in the reel bore. It is, however, difficult to position the reels on the arbor because the fitting position between the wings and the recesses of the reel bore is as a rule only reached when the tape reel is turned a little in relation to the turntable.

To enable easy setting on the turntable—if necessary without looking—another known drive arrangement for film reels consists of a cylindrical arbor with several sprung catches distributed around its circumference at equal distances, for securing axially the reel, while the actual drive is performed by an axial drive pin which exerts a sprung pressure from below against the reel, which pin either immediately or shortly after the tape motion is switched on automatically falls into an opening of the reel made to fit the pin. This arrangement therefore requires additional catch elements apart from the drive pin.

A further known drive arrangement for portable magnetic tape apparatus shows an arbor with a head portion sprung radially, which simultaneously ensures the axial securing of the reel and couples it to turn securely with the turntable in every position in which it is set. The last named solution, however, has the disadvantage that under greater tape tension undesirable slipping occurs between reel and turntable.

The aim of the invention is to avoid in the simplest way the disadvantages of the arrangements described.

In order to secure the reel body both axially and against rotation each of the axial grooves can be replaced by a radial boring adapted to the shape of the catch element.

Further details of the invention are illustrated in the exemplary embodiments shown in the accompanying drawing. In the drawing:

FIG. 1 indicates a sectional view of an arbor with tape reel laid on,

FIG. 2 a sectional view in accordance with the section marked II—II in FIG. 1, through the core of the reel body and the arbor and FIG. 3 a sectional view showing a modification with a safety device preventing axial displacement and relative rotation of the tape reel on the arbor.

In FIG. 1, 1 indicates a turntable with a hollow cylindrical arbor 2, which is closed at the top by a flat conical cover 3 and has laid on it a double flanged reel 4. The arbor contains an annularly bent leaf spring 5, whose one end 6 is fixed to the inside wall 7 (FIG. 2) of the arbor and whose other end 8 bears a catch element 9 having the shape of a cylindrical pin. The catch pin passes through a radial bore 10 (FIG. 1) of the arbor and catches in one of three grooves 11 of the flanged reel parallel to the turntable axis. The end of the catch pin protruding from the arbor is hemispherical, so that the reel body can be easily laid on the arbor even when the catch pin is in a position not coinciding with any groove. In such a laid-on position the reel slips a maximum of one third of a revolution during initial motion of the tape, until the catch pin falls automatically into the next groove, thus preventing relative rotation of the tape reel on the arbor.

The tape reel can be additionally secured against axial displacement where instead of each groove 11 (FIG. 1) a radial bore 12 (FIG. 3) is provided for the catch pin. The last described coupling arrangement therefore secures the tape reel not only against rotation on the arbor but also simultaneously against axial displacement during tape motion.

What is claimed is:

1. Coupling device comprising in combination an arbor and a tape reel, said arbor being formed as a closed hollow cylinder, said tape reel having a central hollow core adapted to slip on said tape reel on said arbor, said hollow cylinder containing exclusively a circularly bent flat spring, one end of which is fixed to the inside of said hollow cylinder, the other end of said flat spring bearing a catch element shaped as a cylindrical pin with a hemispherical end, said hollow cylinder being provided with a radial bore, said catch element being adapted to be extended through said bore of said hollow cylinder and to fit into one of several axial grooves of said tape reel, said axial grooves being provided on the inside of the hollow core of said tape reel.

2. Coupling device comprising in combination an arbor and a tape reel, said arbor being formed as a closed hollow cylinder, said tape reel having a central hollow core adapted to slip on said tape reel on said arbor, said hollow cylinder containing exclusively a circularly bent flat spring, one end of which is fixed to the inside of said hollow cylinder, the other end of said flat spring bearing a catch element shaped as a cylindrical pin with a hemispherical end, said hollow cylinder being provided with a radial bore, said catch element being adapted to be extended through said bore of said hollow cylinder and to fit into one of several radial depressions provided on the inside of the hollow core of said tape reel.

References Cited

UNITED STATES PATENTS

| | | | |
|---|---|---|---|
| 1,041,184 | 10/1912 | Spiro. | |
| 1,179,924 | 4/1916 | Howell | 242—68.3 |
| 1,503,896 | 8/1924 | Harris | 242—68.3 |
| 1,946,455 | 2/1934 | Davis. | |
| 2,983,460 | 5/1961 | Wright | 242—68.3 |
| 3,058,686 | 10/1962 | Field | 242—68.3 |

FRANK J. COHEN, *Primary Examiner.*

N. L. MINTZ, *Assistant Examiner.*